(12) United States Patent
Barnett et al.

(10) Patent No.: US 10,887,509 B2
(45) Date of Patent: Jan. 5, 2021

(54) SYSTEMS AND METHODS FOR DYNAMICALLY PROVIDING LAYOUTS BASED ON MEDIA CONTENT SELECTION

(71) Applicant: Facebook, Inc., Menlo Park, CA (US)

(72) Inventors: John Samuel Barnett, Newark, CA (US); Joshua Barton Dickens, Oakland, CA (US); Bryan Kenneth Summersett, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 294 days.

(21) Appl. No.: 14/961,276

(22) Filed: Dec. 7, 2015

(65) Prior Publication Data

US 2017/0160909 A1   Jun. 8, 2017

(51) Int. Cl.
   G06F 3/048   (2013.01)
   H04N 5/232   (2006.01)
   G06T 11/60   (2006.01)

(52) U.S. Cl.
   CPC ......... H04N 5/23229 (2013.01); G06T 11/60 (2013.01); H04N 5/23293 (2013.01); G06F 2203/04803 (2013.01)

(58) Field of Classification Search
   CPC ......... G06F 17/30277; G06F 17/30047; G06F 3/04842; G06F 3/04845
   See application file for complete search history.

(56) References Cited

U.S. PATENT DOCUMENTS

| | | | | |
|---|---|---|---|---|
| 9,219,830 B1* | 12/2015 | Ciorba | ............... | H04N 1/00164 |
| 2001/0014184 A1* | 8/2001 | Bubie | ................ | H04N 1/00161 |
| | | | | 382/293 |
| 2003/0160824 A1* | 8/2003 | Szumla | .................... | G06T 11/60 |
| | | | | 715/769 |
| 2006/0209316 A1* | 9/2006 | Toda | .................. | H04N 1/00278 |
| | | | | 358/1.1 |
| 2010/0199227 A1* | 8/2010 | Xiao | ..................... | G06F 3/0481 |
| | | | | 715/863 |
| 2010/0259544 A1* | 10/2010 | Chen | ....................... | G06T 11/60 |
| | | | | 345/441 |
| 2011/0087666 A1* | 4/2011 | Chou | .................... | G06F 16/583 |
| | | | | 707/737 |
| 2011/0099501 A1* | 4/2011 | Mull | .................. | G06F 3/04845 |
| | | | | 715/771 |
| 2012/0120186 A1* | 5/2012 | Diaz | .................... | H04N 5/2258 |
| | | | | 348/36 |
| 2012/0201479 A1* | 8/2012 | Zhang | .................. | G06T 3/4038 |
| | | | | 382/284 |
| 2013/0155308 A1* | 6/2013 | Wu | ..................... | H04N 5/23293 |
| | | | | 348/333.05 |

(Continued)

OTHER PUBLICATIONS https://iphonephotographyschool.com/instagram-layout-app-collages/.*

Primary Examiner — Hua Lu
(74) Attorney, Agent, or Firm — Sheppard Mullin Richter & Hampton LLP

(57) ABSTRACT

Systems, methods, and non-transitory computer-readable media can receive a selection to include at least a first media content item, out of a collection of media content items, for presentation in one or more collages. A set of layouts can be dynamically provided based on the selection of at least the first media content item. A preview of the set of layouts can be dynamically presented. The preview of the set of layouts can visually represent the one or one more collages.

20 Claims, 10 Drawing Sheets

(56) References Cited

U.S. PATENT DOCUMENTS

| | | | |
|---|---|---|---|
| 2013/0239049 A1* | 9/2013 | Perrodin | G06F 3/0481 |
| | | | 715/800 |
| 2014/0053200 A1* | 2/2014 | de Paz | H04N 21/431 |
| | | | 725/44 |
| 2014/0193047 A1* | 7/2014 | Grosz | G06Q 10/10 |
| | | | 382/118 |
| 2014/0195921 A1* | 7/2014 | Grosz | G06Q 30/0601 |
| | | | 715/738 |
| 2014/0368600 A1* | 12/2014 | Do | G06K 9/00221 |
| | | | 348/14.01 |
| 2015/0116542 A1* | 4/2015 | Lee | H04N 5/2621 |
| | | | 348/231.6 |
| 2015/0278595 A1* | 10/2015 | Momoki | G06F 16/51 |
| | | | 382/218 |
| 2016/0055379 A1* | 2/2016 | Svendsen | G06K 9/00228 |
| | | | 382/224 |
| 2016/0139761 A1* | 5/2016 | Grosz | G06F 40/106 |
| | | | 715/769 |
| 2017/0039747 A1* | 2/2017 | Ishida | G06T 1/0007 |
| 2017/0091592 A1* | 3/2017 | Iwabuchi | G06K 9/6218 |
| 2017/0155849 A1* | 6/2017 | Qin | H04N 5/23293 |

* cited by examiner

SYSTEMS AND METHODS FOR DYNAMICALLY PROVIDING LAYOUTS BASED ON MEDIA CONTENT SELECTION

FIELD OF THE INVENTION

The present technology relates to the field of media processing. More particularly, the present technology relates to techniques for dynamically providing layouts based on media content selection.

BACKGROUND

Today, people often utilize computing devices (or systems) for a wide variety of purposes. Users can use their computing devices to, for example, interact with one another, access content, share content, and create content. In some cases, users of a social networking system (or service) can utilize their computing devices to create and post (or publish) media content items, such as images, videos, audio, and text. For example, a user can create and post one or more collages of media content items.

In order to create collages, users generally select layouts with frames in which media content items are to be presented. Conventional approaches rooted in computer technology generally require users to first select a particular layout with frames and then subsequently fill in the frames of the particular layout with selected media content items. However, such conventional approaches to utilizing layouts to create collages can be difficult or inconvenient at least because users may not have an idea of how their collages will appear. Moreover, conventional approaches to creating collages can be inefficient for featuring or presenting faces depicted in media content items. As such, conventional approaches can create challenges for or reduce the overall user experience associated with creating collages.

SUMMARY

Various embodiments of the present disclosure can include systems, methods, and non-transitory computer readable media configured to receive a selection to include at least a first media content item, out of a collection of media content items, for presentation in one or more collages. A set of layouts can be dynamically provided based on the selection of at least the first media content item. A preview of the set of layouts can be dynamically presented. The preview of the set of layouts can visually represent the one or one more collages.

In an embodiment, it can be detected that the selection has been updated to include at least a second media content item in addition to the first media content item. The set of layouts can be dynamically updated based on the selection of at least the first media content item and the second media content item. The preview of the set of layouts can be dynamically updated. Each layout in the set of layouts can present at least the first media content item and the second media content item.

In an embodiment, layouts in the set of layouts can be dynamically selected based on at least one of a quantity of media content items included in the selection, a media content type for each media content item included in the selection, or a property for each media content item included in the selection.

In an embodiment, each layout in the set of layouts can be associated with a respective plurality of frames. Each layout in the set of layouts can produce a respective collage based on the respective plurality of frames.

In an embodiment, each layout in the set of layouts can be editable with respect to frame size, frame position, media content zoom, media content position, or media content orientation.

In an embodiment, a location of a face depicted in the first media content item can be determined. The first media content item to be presented within the respective plurality of frames for each layout can be adjusted based on the location of the face. Adjusting the first media content can maximize an area of the face to be presented within at least some of the respective plurality of frames for each layout.

In an embodiment, adjusting the first media content item can include at least one of positioning the first media content item or zooming the first media content item.

In an embodiment, an option to navigate through the preview of the set of layouts based on scrolling can be provided.

In an embodiment, one or more layouts in the set of layouts can be selected based on historical data.

In an embodiment, a live camera view for a front-facing camera of a computing system can be modified to produce a modified live camera view. The modified live camera view can be zoomed at a specified zoom level and can be shifted vertically in a specified shift amount.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
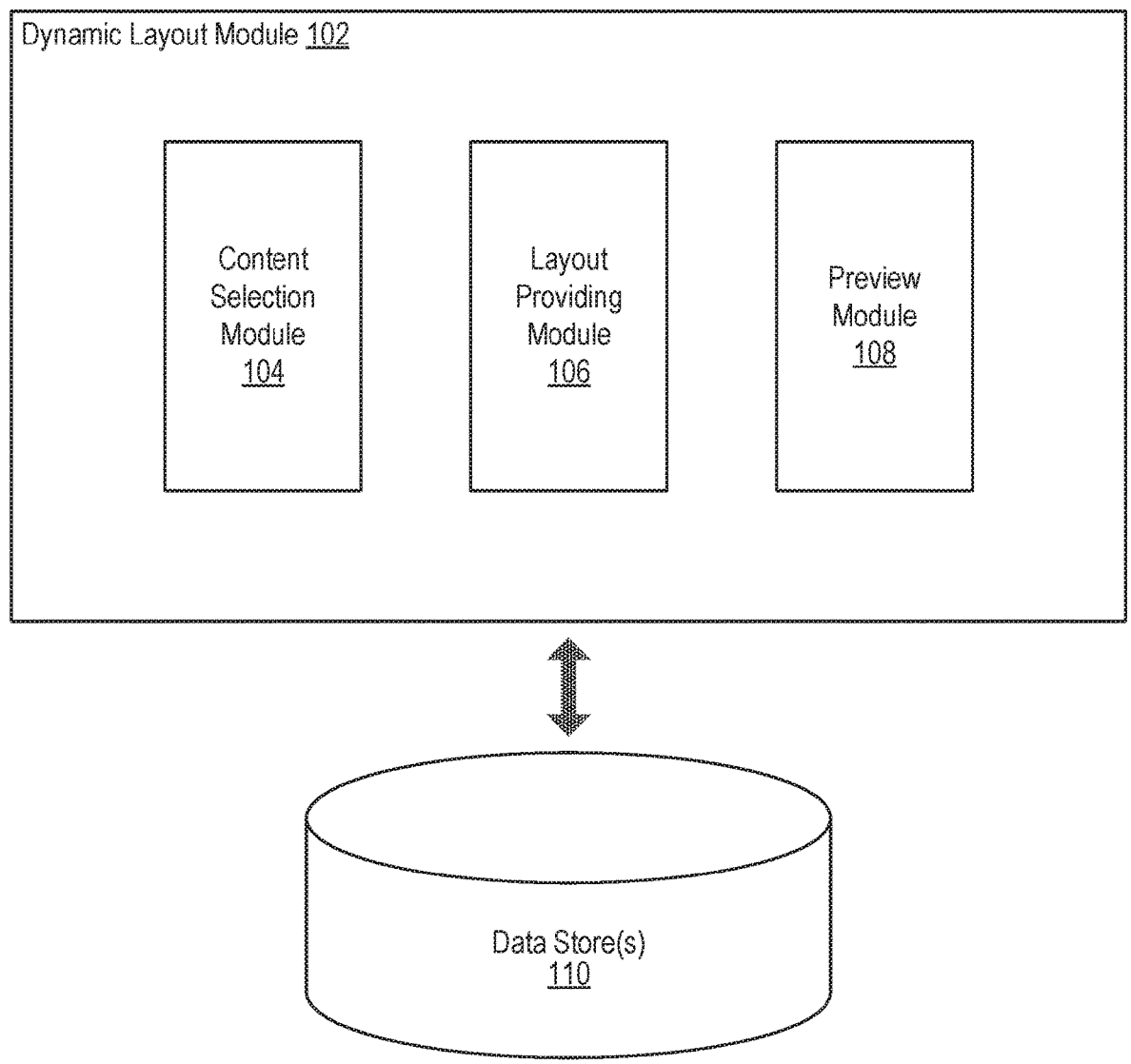
FIG. 1 illustrates an example system including an example dynamic layout module configured to facilitate dynamically providing layouts based on media content selection, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Dynamically Providing Layouts Based on Media Content Selection

People use social networking systems (or services) for various purposes. Users of a social networking system can utilize their computing devices (or systems) to establish connections, communicate, and interact with one another via the social networking system. Users can also provide, edit, share, or access media content items such as pictures, videos, audio, and text. For example, a user can utilize his or her computing device to combine one or more media content items, such as one or more images, in order to form a collage (e.g., a collage image). The collage can subsequently be shared or posted by the user via the social networking system.

Under conventional approaches rooted in computer technology, creating a collage often times requires the user to first select a particular layout with defined frames and then subsequently fill in the defined frames with media content selected by the user. In accordance with such conventional approaches to creating collages, the user may not know which layout(s) will be desirable or aesthetically pleasing with which media content item(s), or vice versa. As such, conventional approaches can create difficulty or challenges for the user in selecting the particular layout. Similarly, conventional approaches can create difficulty or challenges for the user in selecting media content to be included, depicted, or presented in the selected particular layout.

Moreover, conventional approaches to creating collages can often times be inefficient at presenting or featuring faces depicted in media content included in collages. For instance, collages initially generated using conventional approaches may undesirably cut off or crop out one or more faces (or at least portions thereof) depicted in various media content items included the collages. As such, conventional approaches can create challenges for or reduce the overall user experience associated with creating, sharing, or otherwise utilizing collages.

Due to these or other concerns, conventional approaches can be disadvantageous or undesirable. Therefore, an improved approach can be beneficial for addressing or alleviating various drawbacks associated with conventional approaches. Based on computer technology, the disclosed technology can dynamically provide layouts based on media content selection. Various embodiments of the present disclosure can receive a selection to include at least a first media content item, out of a collection of media content items, for presentation in one or more collages. A set of layouts can be dynamically provided based on the selection of at least the first media content item. A preview of the set of layouts can be dynamically presented. The preview of the set of layouts can visually represent the one or one more collages. It is contemplated that there can be many variations and/or other possibilities associated with the disclosed technology.

FIG. 1 illustrates an example system 100 including an example dynamic layout module 102 configured to facilitate dynamically providing layouts based on media content selection, according to an embodiment of the present disclosure. As shown in the example of FIG. 1, the dynamic layout module 102 can include a content selection module 104, a layout providing module 106, and a preview module 108. In some instances, the example system 100 can include at least one data store 110. The components (e.g., modules, elements, etc.) shown in this figure and all figures herein are exemplary only, and other implementations may include additional, fewer, integrated, or different components. Some components may not be shown so as not to obscure relevant details.

In some embodiments, the dynamic layout module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the dynamic layout module 102 can be implemented, in part or in whole, as software running on one or more computing devices or systems, such as on a user or client computing device. For example, the dynamic layout module 102 or at least a portion thereof can be implemented as or within an application (e.g., app), a program, an applet, or an operating system, etc., running on a user computing device or a client computing system, such as the user device 710 of FIG. 7. In another example, the dynamic layout module 102 or at least a portion thereof can be implemented using one or more computing devices or systems that include one or more servers, such as network servers or cloud servers. In some instances, the dynamic layout module 102 can, in part or in whole, be implemented within or configured to operate in conjunction with a social networking system (or service), such as the social networking system 730 of FIG. 7. It should be understood that there can be many variations or other possibilities.

The content selection module 104 can be configured to facilitate receiving a selection to include at least a first media content item, out of a collection of media content items, for presentation in one or more collages. In some cases, a computing device (or system) can implement, run, or include at least an instance or a portion of the dynamic layout module 102. In some instances, a user of the computing device can desire to create one or more collages using certain media content items. The user can perform one or more commands, which can cause the selection of at least the first media content item to be received by the content selection module 104. The one or more collages can be created based on at least the selected first media content item.

Moreover, in some cases, the content selection module 104 can detect that the selection has been updated to include at least a second media content item in addition to the first media content item. For instance, the user can perform one or more additional commands, which can cause the selection of at least the second media content item to be received by the content selection module 104. The one or more collages can then be created based on at least the selected first and second media content items.

In one example, the user of the computing device can be provided with the collection of media content items, which can include one or more images, videos, etc., from a camera roll or a media library of the computing device. The user can perform one or more commands, such as by clicking on, tapping on, or otherwise interacting with the media content items, to select at least some media content item (e.g., at least the first media content item, at least the first and second media content items, etc.) from which a collage can be generated. In this example, the content selection module 104 can be configured to facilitate detecting the one or more commands and receiving the selection of the at least some media content items. The selected media content item(s) can then be included, depicted, and/or presented in the collage. It should be appreciated that all examples herein are provided for illustrative purposes and that there can be many variations or other possibilities associated with the disclosed technology.

The layout providing module 106 can be configured to facilitate dynamically providing a set of layouts based on the selection of at least the first media content item. For instance, based on how many media content items are selected (e.g., including at least the first media content item) out of the collection, the layout providing module 106 can determine which layouts to provide in the set of layouts. More details regarding the layout providing module 106 will be provided below with reference to FIG. 2A.

The preview module 108 can be configured to facilitate dynamically presenting a preview of the set of layouts. The preview of the set of layouts can visually represent the one or one more collages. For example, the preview module 108 can provide (e.g., dynamically provide, provide in/near real-time, etc.) a respective thumbnail preview for each layout in the set of layouts, and each layout can depict the selected media content item(s) including at least the first media content item. The preview module 108 will be discussed in more detail with reference to FIG. 2B.

Furthermore, in some embodiments, the dynamic layout module 102 can be configured to communicate and/or operate with the at least one data store 110, as shown in the example system 100. The at least one data store 110 can be configured to store and maintain various types of data. In some implementations, the at least one data store 110 can store information associated with the social networking system (e.g., the social networking system 730 of FIG. 7). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 110 can store information associated with users, such as user identifiers, user information, profile information, user locations, user specified settings, content produced or posted by users, and various other types of user data. In some embodiments, the at least one data store 110 can store information that is utilized by the dynamic layout module 102, such as data associated with various media content and layouts. Again, it is contemplated that there can be many variations or other possibilities.

Figure 2A:
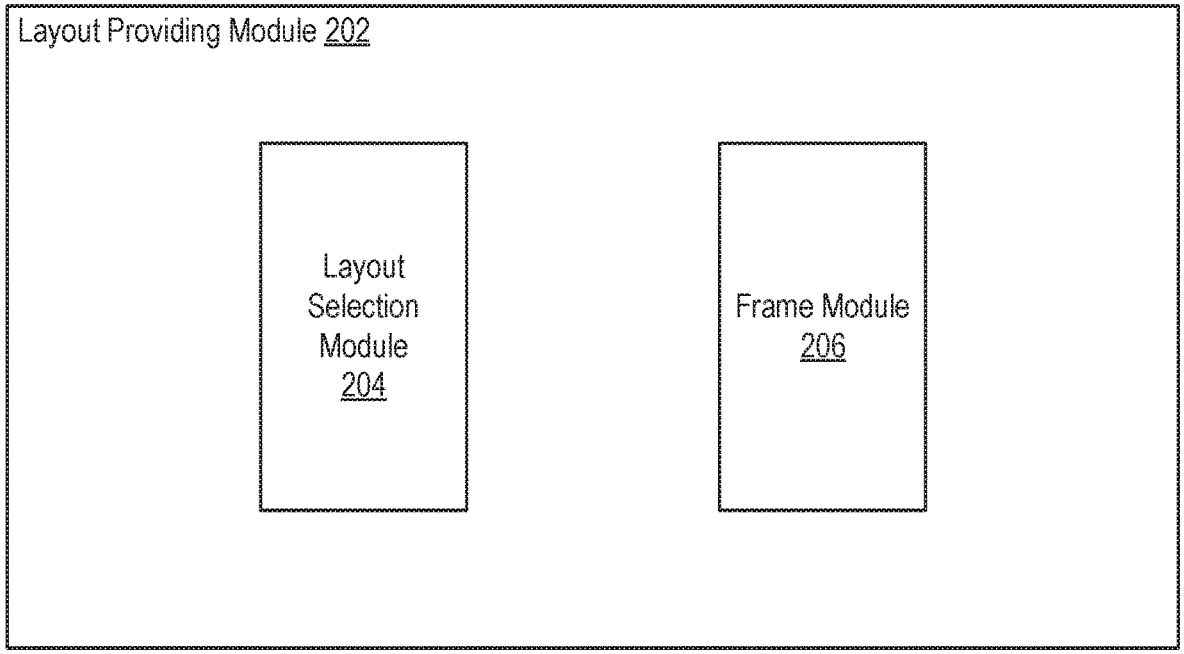
FIG. 2A illustrates an example layout providing module configured to facilitate dynamically providing layouts based on media content selection, according to an embodiment of the present disclosure.

FIG. 2A illustrates an example layout providing module 202 configured to facilitate dynamically providing layouts based on media content selection, according to an embodiment of the present disclosure. In some embodiments, the layout providing module 106 of FIG. 1 can be implemented as the example layout providing module 202. As shown in FIG. 2A, the layout providing module 202 can include a layout selection module 204 and a frame module 206.

As discussed previously, the layout providing module 202 can facilitate dynamically providing a set of layouts based on a selection of at least a first media content item out of a collection of media content items. The layout providing module 202 can also facilitate dynamically updating the set of layouts based on a selection of at least the first media content item and a second media content item (and/or other media content items). In some embodiments, the layout providing module 202 can utilize the layout selection module 204 to select which layouts are to be included in the set of layouts. Various layouts can, for instance, have already been generated based on manual or other efforts, and the layout selection module 204 can appropriately identify or select certain layouts that are to be included in the set of layouts. In some cases, the layout selection module 204 can specify or predefine criteria that need to be satisfied, or a scenario that needs to occur, in order for a particular layout to be selected for inclusion in the set of layouts. The layout selection module 204 can also dynamically determine or detect when the criteria has been satisfied or when the scenario has occurred. In some instances, the layout selection module 204 can preselect a respective set of layouts for each of various scenarios. As such, the layouts to be included in the set of layouts can be provided dynamically and/or in real-time (or near real-time).

In one example, layouts in the set of layouts can be dynamically selected by the layout selection module 204 based on a quantity of media content items included in the selection. In this example, if there is a scenario where one media content item is selected, then a first set of layouts can be selected, defined, or provided in (or near) real-time. A first layout in the first set can include two horizontally vertically parallel frames, each presenting the one media content item. A second layout in the first set can include two horizontally parallel frames, each presenting the one media content item. A third layout in the first set can include three vertically parallel frames, each presenting the one media content item. A fourth layout in the first set can include three horizontally parallel frames, each presenting the one media content item, and so forth. Continuing with this example, if there is another scenario where two media content items are selected, then a second set of layouts can be provided in real-time. A first layout in the second set can include two vertically parallel frames, with one frame presenting one of the two media content items and with the other frame presenting the other of the two media content items. A second layout in the second set can include two horizontally parallel frames, with one frame presenting one of the two media content items and with the other frame presenting the other of the two media content items. A third layout in the second set can include three vertically parallel frames, with one frame presenting one of the two media content items and with the other two frames presenting the other of the two media content items, and so forth. It is contemplated that all examples herein are provided for illustrative purposes and that there can be many variations.

In another example, layouts in the set of layouts can be dynamically selected by the layout selection module 204 based on a media content type for each media content item included in the selection. In this example, the layout selection module 204 can select, define, or provide a first set of layouts when the selected media content items include images and can select, define, or provide a second set of layouts when the selected media content items include videos.

In a further example, layouts in the set of layouts can be dynamically selected by the layout selection module 204 based on a property for each media content item included in the selection. In this example, the layout selection module 204 can select, define, or provide a first set of layouts when the selected media content items are in a landscape orientation and can select, define, or provide a second set of layouts when the selected media content items are in a portrait orientation.

Additionally, in some implementations, the layout providing module 202 can utilize the frame module 206 to facilitate performing various operations or handing various tasks associated with frames within each layout. In some embodiments, each layout in the set of layouts can be associated with a respective plurality of frames. In some cases, the quantity, size, position, and/or appearance, etc., of the frames within each layout can be generated or set based on manual or other efforts. Each layout in the set of layouts can produce a respective collage based on the respective plurality of frames. For instance, a layout with a particular quantity of frames can be filled with media content items of that particular quantity (including any duplicate media content items) to produce a collage.

In some implementations, the frame module 206 can be configured to facilitate editing frames within layouts. Each layout in the set of layouts can, for instance, be editable with respect to frame size, frame position, media content zoom, media content position, or media content orientation. In one example, the frame module 206 can enable the respective plurality of frames in each layout to be resized, moved, or switched. In another example, the frame module 206 can enable media content items within the respective plurality of frames in each layout to be editable (e.g., zoomed in, zoomed out, moved, dragged, rotated, flipped, filtered, etc.).

Furthermore, in some embodiments, the frame module 206 can utilize one or more object detection processes (e.g., face detection techniques) to determine a location of an object, such as a face, depicted in a media content item. The frame module 206 can further adjust, based on the location of the object (e.g., face), the media content item to be presented within the respective plurality of frames for each layout. Adjusting the media content item can attempt to maximize an area of the object (e.g., face) to be presented within at least some of the respective plurality of frames for each layout. In some instances, adjusting the media content item can include at least one of positioning the media content item or zooming (in or out) the media content item.

As discussed, it should be understood that all examples herein are provided for illustrative purposes and many variations associated with the disclosed technology are possible. For instance, in some cases, one or more layouts in the set of layouts can be selected based on historical data. In this instance, if there is a pattern or trend suggesting that a user is likely to utilize a particular layout in a particular scenario, then when that particular scenario occurs, the layout providing module 202 can select that particular layout or at least suggest/emphasize that particular layout (e.g., placing the particular layout first in the set of layouts).

Figure 2B:
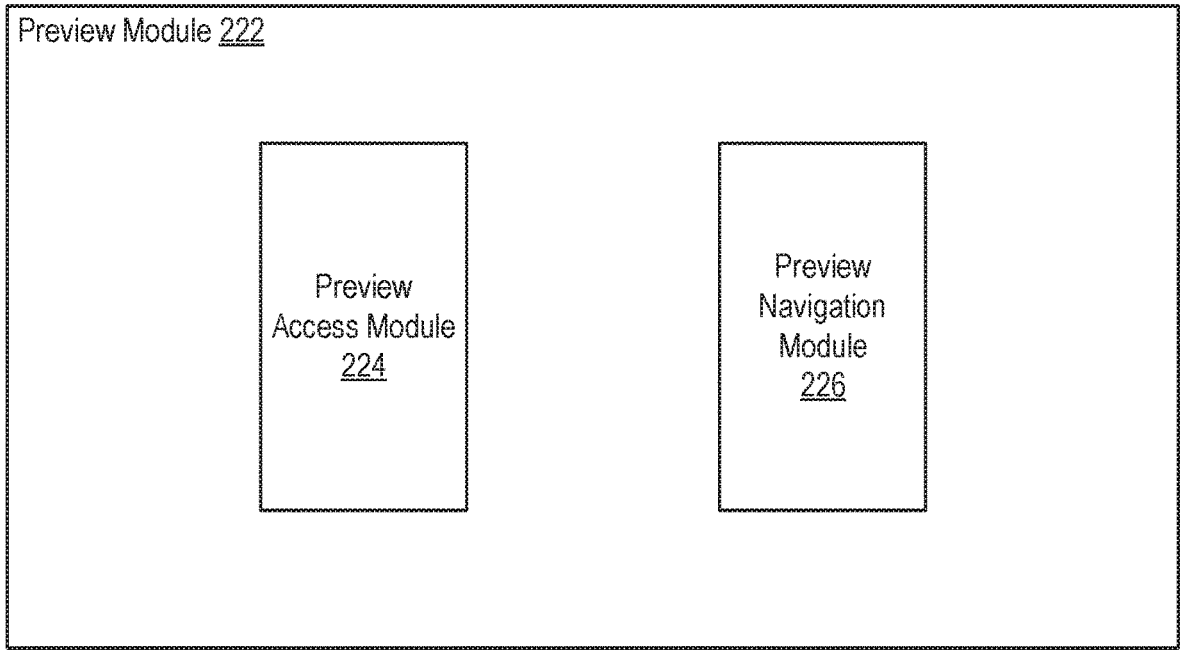
FIG. 2B illustrates an example preview module configured to facilitate dynamically providing layouts based on media content selection, according to an embodiment of the present disclosure.

FIG. 2B illustrates an example preview module 222 configured to facilitate dynamically providing layouts based on media content selection, according to an embodiment of the present disclosure. In some embodiments, the preview module 108 of FIG. 1 can be implemented as the example preview module 222. As shown in FIG. 2B, the preview module 222 can include a preview access module 224 and a preview navigation module 226.

As discussed above, the preview module 222 can facilitate dynamically presenting a preview of a set of layouts. The preview of the set of layouts can visually represent or depict one or one more collages. In some embodiments, the preview module 222 can utilize the preview access module 224 to facilitate providing access to interact or engage with a preview of a particular layout in the set of layouts. In one example, the preview access module 224 can enable a user to click on, tap on, or otherwise interact with the preview (e.g., thumbnail image) of the particular layout. The preview access module 224 can detect the click, tap, or other interaction performed by the user with respect to the preview of the particular layout, and can subsequently enable the user to access the particular layout. In some cases, the preview access module 224 can enable the user to access and edit the particular layout. For example, the preview access module 224 can operate in conjunction with the frame module 206 of FIG. 2A to enable the user to edit one or more frames within the particular layout.

Additionally, in some implementations, the preview module 222 of FIG. 2B can facilitate dynamically updating the preview of the set of layouts. For instance, when a selection of at least a first media content item and a second media content item is received, which can cause the set of layouts to be dynamically updated, the preview module 222 can also (dynamically) update the preview of the set of layouts. In this instance, each layout in the set of layouts can be updated to present at least the first media content item and the second media content item. It should be understood that many variations are possible.

Furthermore, in some embodiments, the preview module 222 can utilize the preview navigation module 226 to facilitate providing an option to navigate through the preview of the set of layouts based on scrolling. For instance, the preview navigation module 226 can be configured to detect a scroll command, such as a mouse drag, a finger drag, a swipe, etc., to scroll, browse, or otherwise navigate through the layouts provided in the preview. Again, it should be appreciated that many variations are possible.

Figure 3:
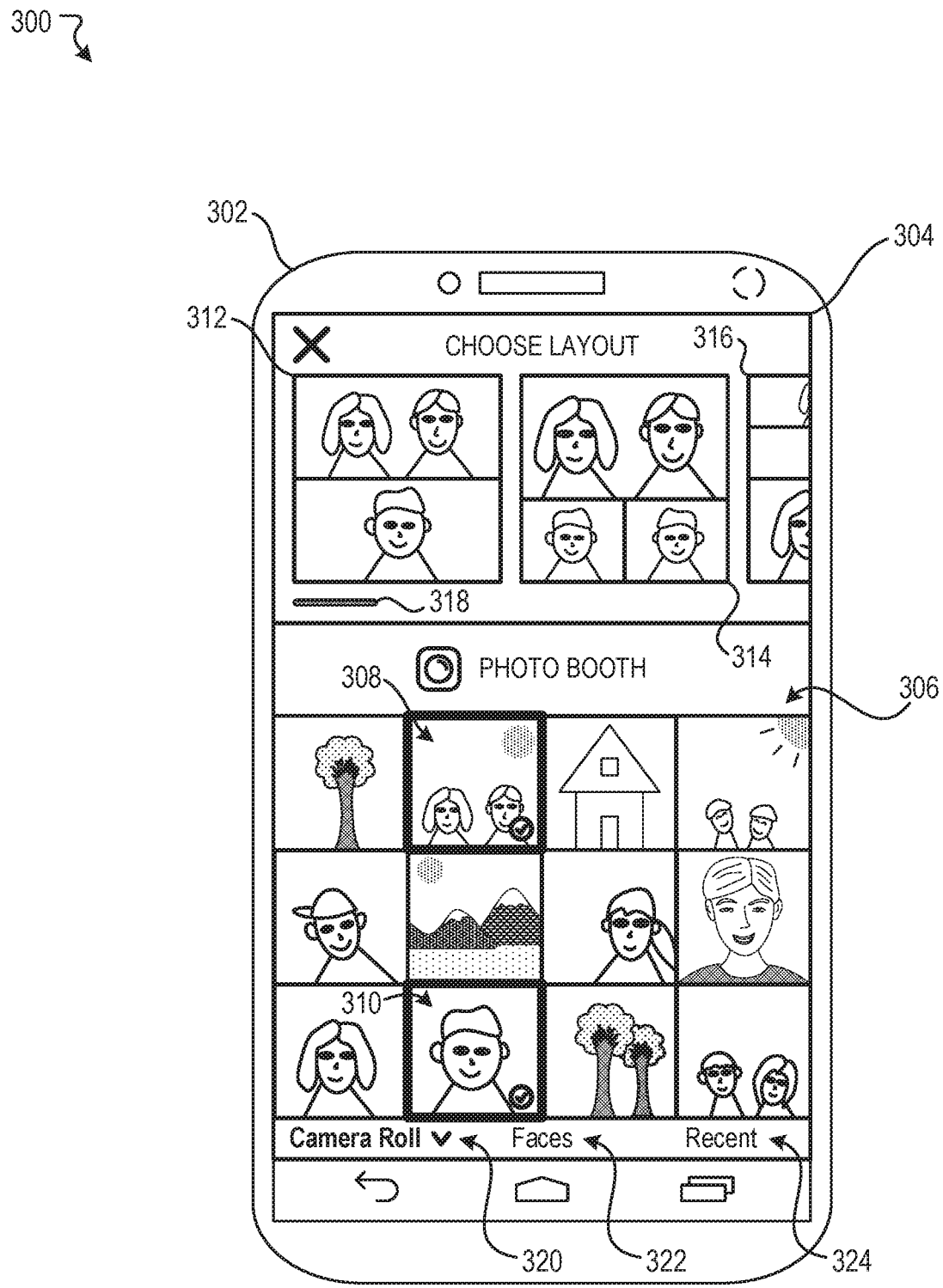
FIG. 3 illustrates an example scenario associated with dynamically providing layouts based on media content selection, according to an embodiment of the present disclosure.

FIG. 3 illustrates an example scenario 300 associated with dynamically providing layouts based on media content selection, according to an embodiment of the present disclosure. The example scenario 300 of FIG. 3 illustrates an example computing device (or system) 302. As shown, the example computing device 302 can present an interface 304 configured to dynamically provide layouts based on media content selection.

In the example scenario 300, the interface 304 can present a collection of media content items 306, such as images and/or videos from a camera roll of the computing device 302. A user of the computing device 302 can select a first media content item 308, which can cause a first set of layouts (not explicitly illustrated in the example scenario 300) to be dynamically selected, provided, and previewed. The user can additionally select a second media content item 310, which can cause a second set of layouts to be dynamically selected, provided, and previewed. As shown in the example scenario 300, a preview of the second set of layouts can include previews for a first layout 312 in the second set, a second layout 314 in the second set, a third layout 316 in the second set, and so forth. In some case, the user can tap or click on each of the previews (e.g., thumbnail images) in order to access or edit each layout.

Moreover, the disclosed technology can enable the preview of the second set of layouts to be navigable, such as via scrolling. The example interface 304 illustrates a scroll bar 318 that moves during scrolling. Furthermore, the interface 304 can provide options (e.g., buttons 320, 322, and 324) to switch the collection of media content items 306 from those within the camera roll, to those that are determined to depict faces, and/or to those that have recently been utilized or accessed. Again, it is contemplated that many variations are possible.

Figure 4:
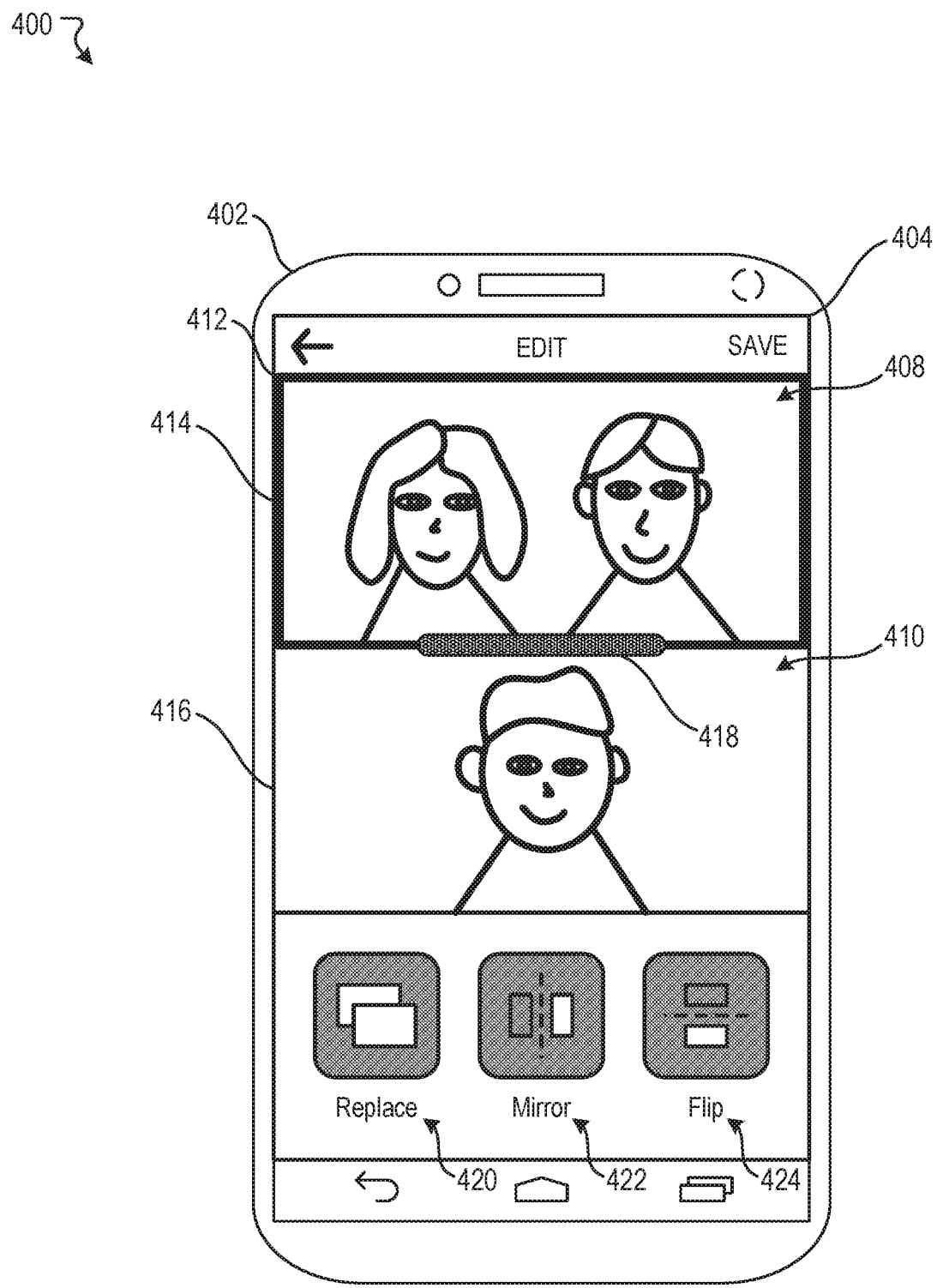
FIG. 4 illustrates an example scenario associated with dynamically providing layouts based on media content selection, according to an embodiment of the present disclosure.

FIG. 4 illustrates an example scenario 400 associated with dynamically providing layouts based on media content selection, according to an embodiment of the present disclosure. The example scenario 400 illustrates an example computing device 402, such as the computing device 302 of FIG. 3. As shown in FIG. 4, the computing device 402 can present an example interface 404. In this example scenario 400, the interface 404 can enable a user of the computing device 402 to edit a particular layout 412, which can include a first frame 414 that presents a first media content item 408 and a second frame 416 that presents a second media content item 410.

In one example, the disclosed technology can enable the user to move each of the frames 414 and 416, such as by dragging one of the frames to switch positions with the other frame. The user can also resize each of the frames. As shown, the user can select the first frame 414 and drag a sizing element, bar, or button 418 in order to resize the first frame 414 from its initial position, which can be determined or set based on the selected media content. In another example, the user can also move or position the media content item within each frame, such as by dragging the media content item. Moreover, the user can adjust the zoom level for the media content item within each frame, such as by finger pinching to zoom out or finger spreading to zoom in. In a further example, the user can adjust an orientation of the media content item, such as by selecting the media content item and then tapping on an option 422 to cause the media content item to be mirrored or another option 424 to cause the media content item to be flipped. In some cases, the media content item can also be rotated. Furthermore, the user can tap on another option 420 to replace the selected media content item with another chosen from a collection of media content items. As discussed, it should be understood that there can be many variations or other possibilities.

Figure 5:
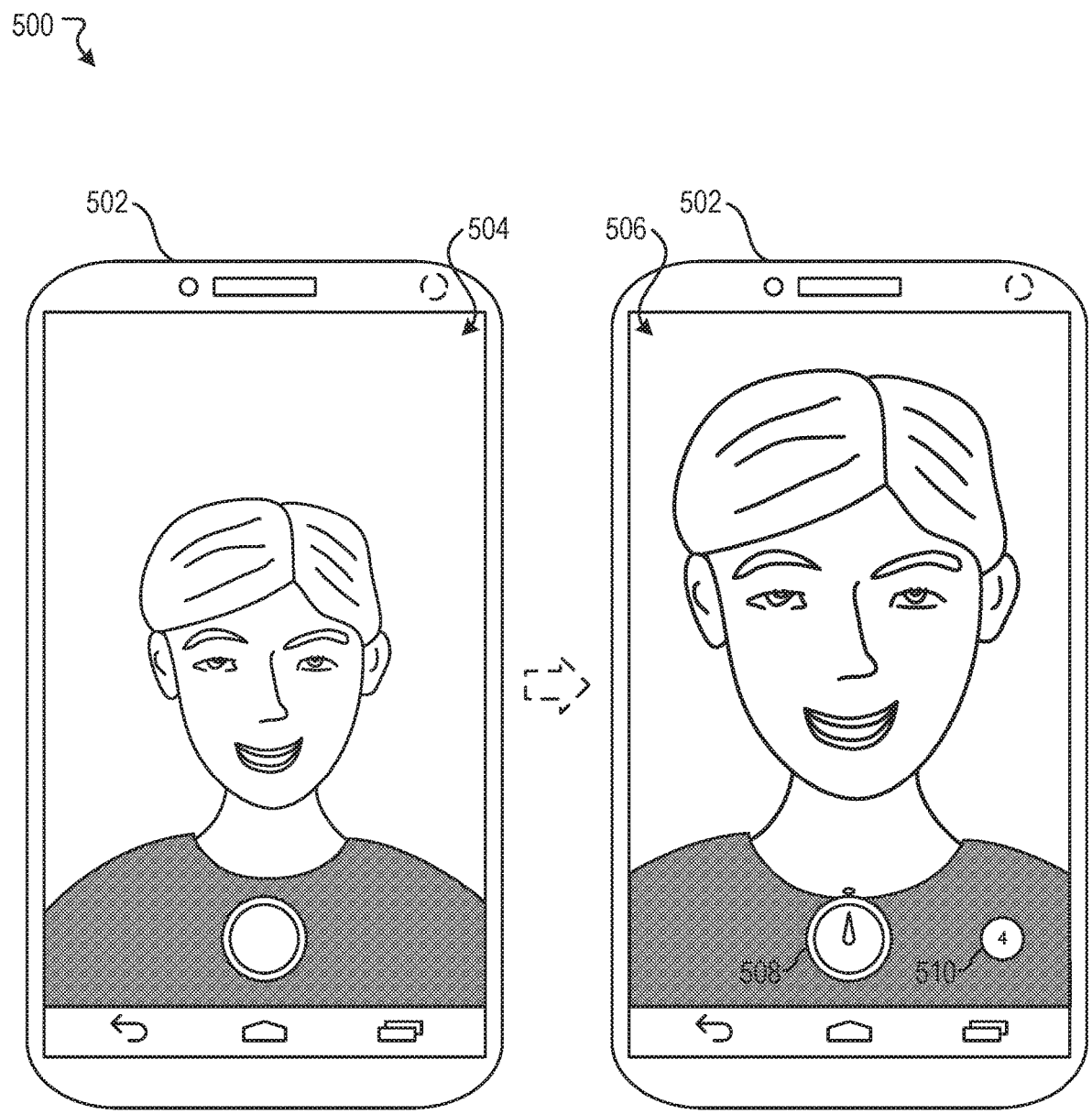
FIG. 5 illustrates an example scenario associated with dynamically providing layouts based on media content selection, according to an embodiment of the present disclosure.

FIG. 5 illustrates an example scenario 500 associated with dynamically providing layouts based on media content selection, according to an embodiment of the present disclosure. As discussed, conventional approaches can often times be inefficient or otherwise undesirable for presenting or featuring faces in collages. Accordingly, the disclosed technology can provide an approach for capturing, recording, or otherwise acquiring media content of a user's face (e.g., a "selfie") in a more desirable or aesthetically pleasing manner.

The example scenario 500 illustrates an example computing system (or device) 502 that is providing a live camera view 504 for a front-facing camera of the computing system 502. In some embodiments, the live camera view 504 for the front-facing camera of the computing system 502 can be modified to produce a modified live camera view 506. The modified live camera view 506 can be zoomed at a specified zoom level and can be shifted vertically in a specified shift amount. For example, the modified live camera view 506 can be zoomed in by 10% to 20% and can be vertically shifted upward by 10%. This can increase the likelihood that the user of the computing system 502 will capture, record, or acquire a more desirable or aesthetically pleasing "selfie" image or video. It is contemplated that any suitable amount, percentage, and/or direction can be utilized for zooming or shifting to produce the modified live camera view 506. In some cases, only the camera view is modified, such that media content acquired using the modified live camera view 506 would not necessarily be zoomed or shifted. In some cases, media content acquired using the modified live camera view 506 can be utilized to layouts to create collages. Many variations are possible. In one instance, an option 508 for a self-timer can be provided. In another instance, an option 510 for sequential media content acquisition (e.g., burst photography) can be provided.

Figure 6A:
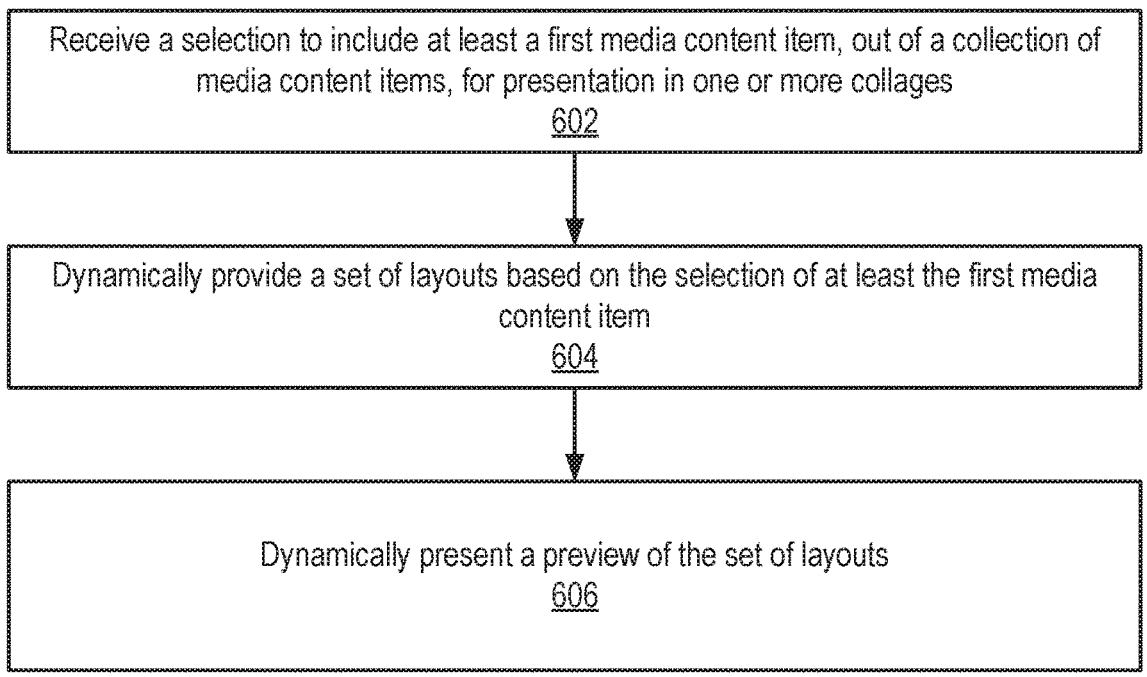
FIG. 6A illustrates an example method associated with dynamically providing layouts based on media content selection, according to an embodiment of the present disclosure.

FIG. 6A illustrates an example method 600 associated with dynamically providing layouts based on media content selection, according to an embodiment of the present disclosure. It should be appreciated that there can be additional, fewer, or alternative steps performed in similar or alternative orders, or in parallel, within the scope of the various embodiments unless otherwise stated.

At block 602, the example method 600 can receive a selection to include at least a first media content item, out of a collection of media content items, for presentation in one or more collages. At block 604, the example method 600 can dynamically provide a set of layouts based on the selection of at least the first media content item. At block 606, the example method 600 can dynamically present a preview of the set of layouts. The preview of the set of layouts can visually represent the one or one more collages.

Figure 6B:
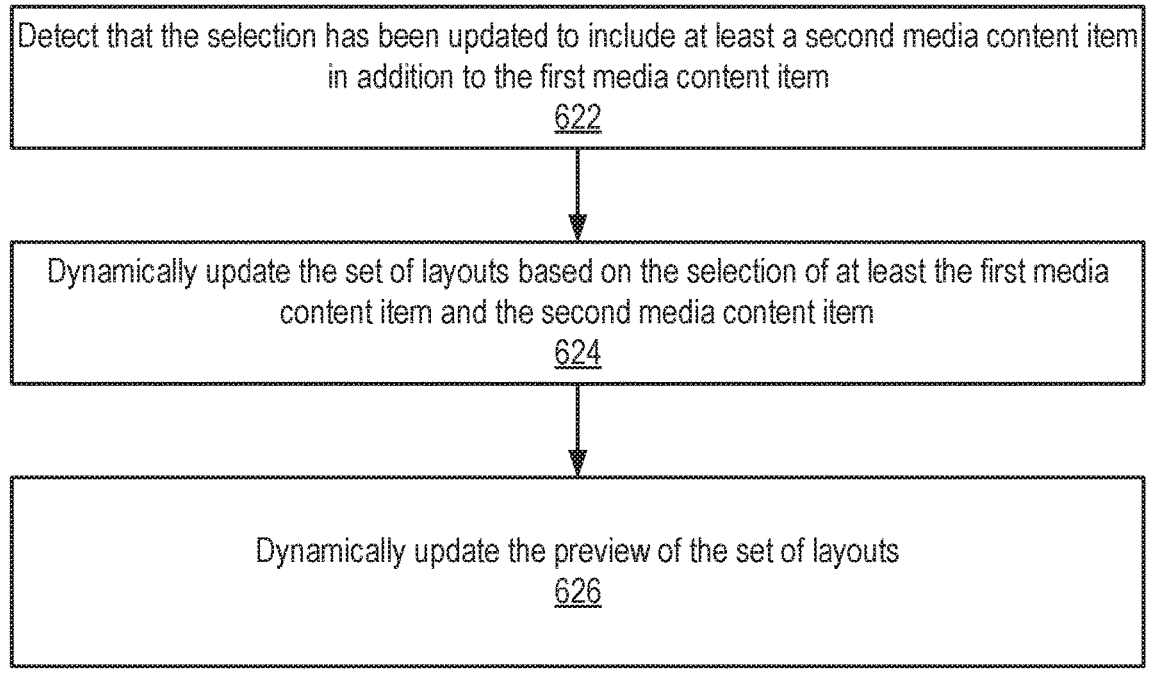
FIG. 6B illustrates an example method associated with dynamically providing layouts based on media content selection, according to an embodiment of the present disclosure.

FIG. 6B illustrates an example method 620 associated with dynamically providing layouts based on media content selection, according to an embodiment of the present disclosure. As discussed, it should be understood that there can be additional, fewer, or alternative steps performed in similar or alternative orders, or in parallel, within the scope of the various embodiments unless otherwise stated.

At block 622, the example method 620 can detect that the selection has been updated to include at least a second media content item in addition to the first media content item. At block 624, the example method 620 can dynamically update the set of layouts based on the selection of at least the first media content item and the second media content item. At block 626, the example method 620 can dynamically update the preview of the set of layouts. Each layout in the set of layouts can present at least the first media content item and the second media content item.

It is contemplated that there can be many other uses, applications, features, possibilities, and/or variations associated with the various embodiments of the present disclosure. For example, in some instances, users can choose whether or not to opt-in to utilize the disclosed technology. The disclosed technology can, for instance, also ensure that various privacy settings and preferences are maintained and can prevent private information from being divulged. In another example, various embodiments of the present disclosure can learn, improve, and/or be refined over time.

Social Networking System—Example Implementation

Figure 7:
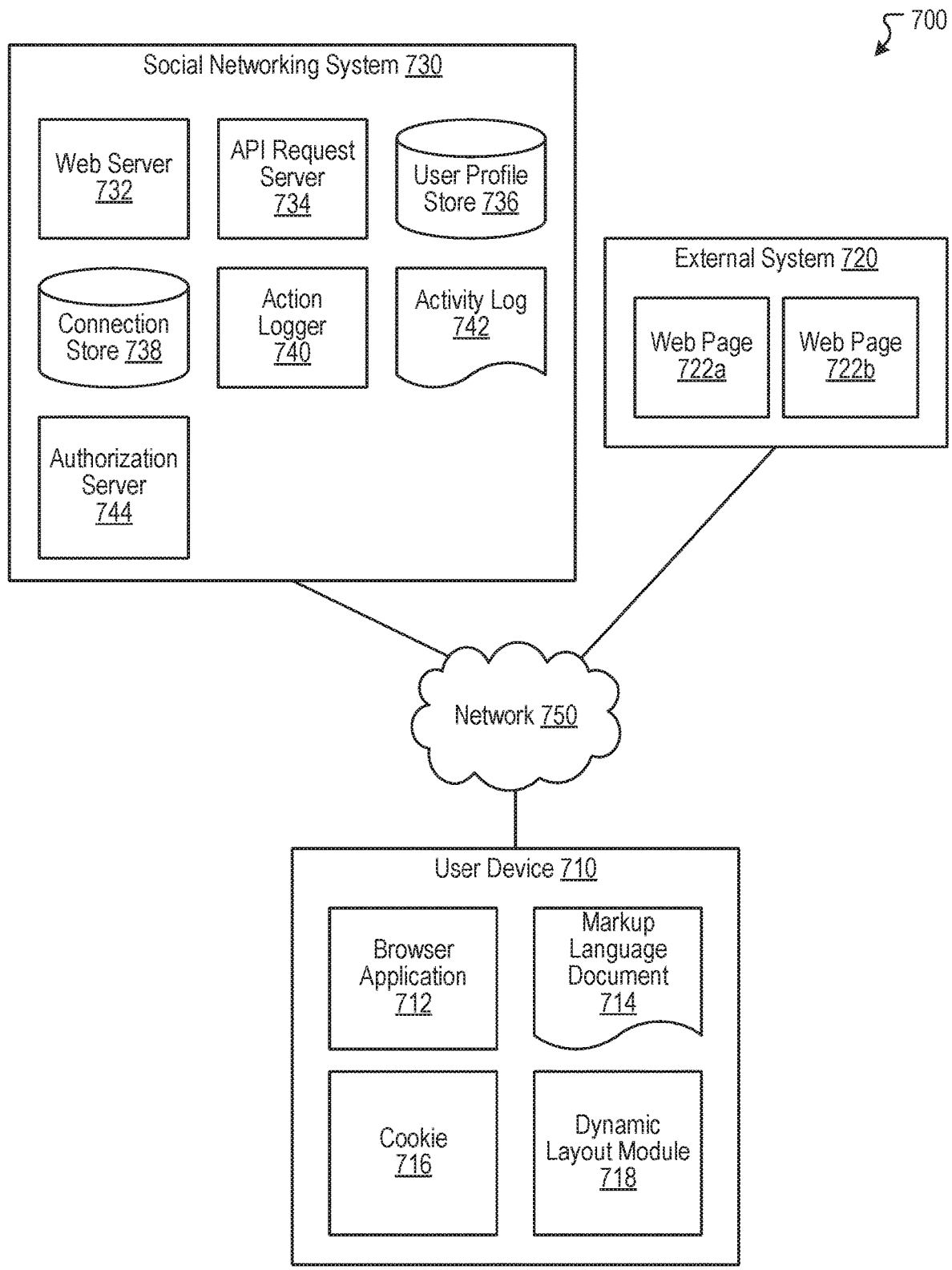
FIG. 7 illustrates a network diagram of an example system including an example social networking system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the Silverlight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include a dynamic layout module 718. The dynamic layout module 718 can, for example, be implemented as the dynamic layout module 102 of FIG. 1. As discussed previously, it should be appreciated that there can be many variations or other possibilities. For example, in some instances, the dynamic layout module 718 (or at least a portion thereof) can be included or implemented in the social networking system 730. Other features of the dynamic layout module 718 are discussed herein in connection with the dynamic layout module 102.

Hardware Implementation

Figure 8:
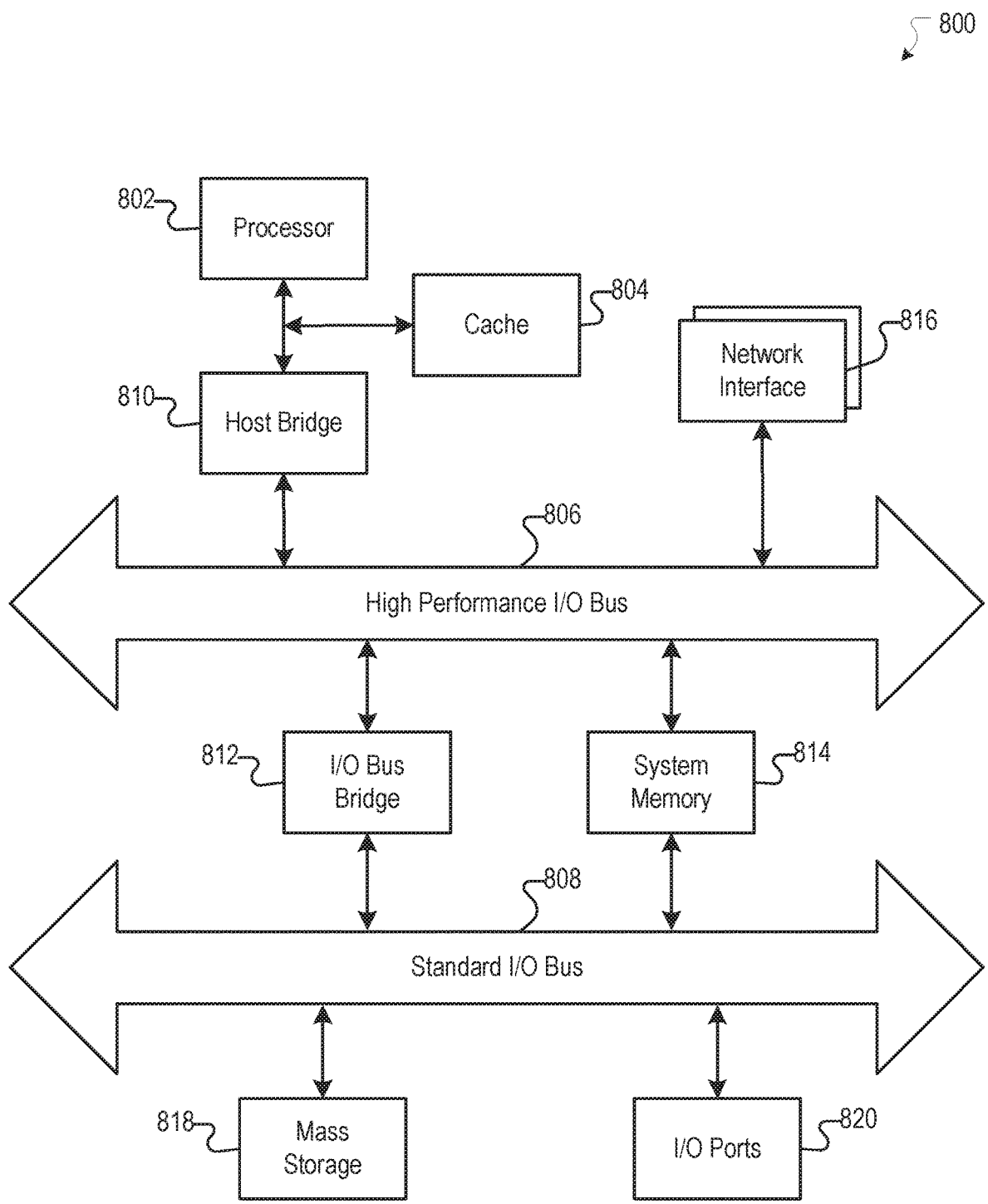
FIG. 8 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments. Furthermore, reference in this specification to "based on" can mean "based, at least in part, on", "based on at least a portion/part of", "at least a portion/part of which is based on", and/or any combination thereof.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:
1. A computer-implemented method comprising:
   providing, by a computing system, a first interface that includes a preview of a set of layouts and a collection of media content items, wherein the set of layouts includes different numbers of frames;

receiving, by the computing system, a selection to include a first media content item, out of the collection of media content items, for presentation in one or more collages;

updating, by the computing system, the preview of the set of layouts based at least in part on a media content type associated with the first media content item, wherein the updating includes first duplicates of the first media content item in the frames of the set of layouts;

adjusting, by the computing system, the first duplicates in the frames of the set of layouts based at least in part on a location of a first object detected in the first duplicates, wherein the adjusting maximizes an area of the first object in the frames;

providing, by the computing system, the updated preview of the set of layouts via the first interface; and further updating, by the computing system, the updated preview of the set of layouts based at least in part on a selection of a second media content item out of the collection of media content items, wherein the further updating includes the first media content item and second duplicates of the second media content item in the frames of the set of layouts.

2. The computer-implemented method of claim 1, further comprising:

providing a second interface to edit a selected layout from the set of layouts based on at least one of: a resize of a frame of the selected layout, a position of a frame of the selected layout, an adjustment of a zoom level for the first media content item or the second media content item, an adjustment of an orientation of the first media content item or the second media content item, an adjustment of a position for the first media content item or the second media content item, or a rotation of the first media content item or the second content item.

3. The computer-implemented method of claim 1, wherein layouts in the set of layouts are selected based on a total quantity of selected media content items and a property for each selected media content item.

4. The computer-implemented method of claim 1, wherein each layout in the set of layouts is associated with a respective plurality of frames, and wherein each layout in the set of layouts produces a respective collage based on the respective plurality of frames.

5. The computer-implemented method of claim 1, wherein the set of layouts includes at least one layout with vertically parallel frames and at least one layout with horizontally parallel frames.

6. The computer-implemented method of claim 1, wherein the first object is a face depicted in the first media content item and the adjusting maximizes the area of the face in the frames.

7. The computer-implemented method of claim 1, wherein adjusting the first duplicates includes at least one of positioning the first duplicates or zooming the first duplicates.

8. The computer-implemented method of claim 1, further comprising:

providing an option to navigate through the preview of the set of layouts based on scrolling.

9. The computer-implemented method of claim 1, wherein one or more layouts in the set of layouts are selected based on historical data.

10. The computer-implemented method of claim 1, further comprising:

modifying a live camera view for a front-facing camera of the computing system to produce a modified live camera view, the modified live camera view being zoomed at a specified zoom level and being shifted vertically in a specified shift amount.

11. A system comprising:

at least one processor; and a memory storing instructions that, when executed by the at least one processor, cause the system to perform:

providing a first interface that includes a preview of a set of layouts and a collection of media content items, wherein the set of layouts includes different numbers of frames;

receiving a selection to include a first media content item, out of the collection of media content items, for presentation in one or more collages;

updating the preview of the set of layouts based at least in part on a media content type associated with the first media content item, wherein the updating includes first duplicates of the first media content item in the frames of the set of layouts;

providing the updated preview of the set of layouts via the first interface; and further updating the updated preview of the set of layouts based at least in part on a selection of a second media content item out of the collection of media content items, wherein the further updating includes the first media content item and second duplicates of the second media content item in the frames of the set of layouts.

12. The system of claim 11, wherein the instructions cause the system to further perform:

providing a second interface to edit a selected layout from the set of layouts based on at least one of: a resize of a frame of the selected layout, a position of a frame of the selected layout, an adjustment of a zoom level for the first media content item or the second media content item, an adjustment of an orientation of the first media content item or the second media content item, an adjustment of a position for the first media content item or the second media content item, or a rotation of the first media content item or the second content item.

13. The system of claim 11, wherein layouts in the set of layouts are selected based on a total quantity of selected media content items and a property for each selected media content item.

14. The system of claim 11, wherein each layout in the set of layouts is associated with a respective plurality of frames, and wherein each layout in the set of layouts produces a respective collage based on the respective plurality of frames.

15. The system of claim 11, wherein the set of layouts includes at least one layout with vertically parallel frames and at least one layout with horizontally parallel frames.

16. A non-transitory computer-readable storage medium including instructions that, when executed by at least one processor of a computing system, cause the computing system to perform a method comprising:

providing a first interface that includes a preview of a set of layouts and a collection of media content items, wherein the set of layouts include different numbers of frames;

receiving a selection to include a first media content item, out of the collection of media content items, for presentation in one or more collages;

updating the preview of the set of layouts based at least in part on a media content type associated with the first media content item, wherein the updating includes first duplicates of the first media content item in the frames of the set of layouts;

adjusting the first duplicates in the frames of the set of layouts based at least in part on a location of a first object detected in the first duplicates, wherein the adjusting maximizes an area of the first object in the frames;

providing the updated preview of the set of layouts via the first interface; and further updating the updated preview of the set of layouts based at least in part on a selection of a second media content item out of the collection of media content items, wherein the further updating includes the first media content item and second duplicates of the second media content item in the frames of the set of layouts.

17. The non-transitory computer-readable storage medium of claim 16, wherein the instructions cause the computing system to further perform:

providing a second interface to edit a selected layout from the set of layouts based on at least one of: a resize of a frame of the selected layout, a position of a frame of the selected layout, an adjustment of a zoom level for the first media content item or the second media content item, an adjustment of an orientation of the first media content item or the second media content item, an adjustment of a position for the first media content item or the second media content item, or a rotation of the first media content item or the second content item.

18. The non-transitory computer-readable storage medium of claim 16, wherein layouts in the set of layouts are selected based on a total quantity of selected media content items and a property for each selected media content item.

19. The non-transitory computer-readable storage medium of claim 16, wherein each layout in the set of layouts is associated with a respective plurality of frames, and wherein each layout in the set of layouts produces a respective collage based on the respective plurality of frames.

20. The non-transitory computer-readable storage medium of claim 16, wherein the set of layouts includes at least one layout with vertically parallel frames and at least one layout with horizontally parallel frames.

* * * * *